(12) United States Patent
Zychowski et al.

(10) Patent No.: US 6,784,222 B2
(45) Date of Patent: Aug. 31, 2004

(54) 100% SOLIDS RADIATION CURABLE CONDUCTIVE PRIMER

(76) Inventors: Frank David Zychowski, 239 Prospect Rd., Berea, OH (US) 44017; Joseph C. Sgro, 14961 Delaware Ave., Lakewood, OH (US) 44107

( * ) Notice: Subject to any disclaimer, the term of this patent is extended or adjusted under 35 U.S.C. 154(b) by 52 days.

(21) Appl. No.: 10/092,654

(22) Filed: Mar. 6, 2002

(65) Prior Publication Data

US 2003/0008934 A1 Jan. 9, 2003

Related U.S. Application Data

(60) Provisional application No. 60/274,000, filed on Mar. 7, 2001.

(51) Int. Cl.$^7$ .................................................. C08F 2/46
(52) U.S. Cl. ............................ 522/80; 522/81; 522/31; 522/41; 522/46; 522/48; 522/53; 522/66; 522/71; 522/75; 522/96; 522/104; 522/107; 522/182; 522/170; 522/174; 522/179; 252/511; 204/192.17; 204/192.14; 427/458
(58) Field of Search .............................. 522/80, 31, 42, 522/46, 48, 53, 66, 71, 75, 81, 96, 104, 107, 182, 170, 174, 179; 252/511; 204/192.17, 192.14; 427/458

(56) References Cited

U.S. PATENT DOCUMENTS

| | | | | | |
|---|---|---|---|---|---|
| 4,040,925 A | * | 8/1977 | McGinniss | .................. | 204/478 |
| 4,319,811 A | * | 3/1982 | Tu et al. | ...................... | 351/166 |
| 4,634,602 A | * | 1/1987 | Sirkoch et al. | ............. | 427/507 |
| 4,900,763 A | * | 2/1990 | Kraushaar | ..................... | 522/14 |
| 4,962,139 A | * | 10/1990 | Lo | ............................. | 523/468 |
| 5,008,134 A | * | 4/1991 | Adkins | ........................ | 427/386 |
| 5,114,756 A | * | 5/1992 | Mirabeau et al. | ........... | 427/379 |
| 5,282,887 A | * | 2/1994 | Gay et al. | .................... | 106/261 |
| 5,453,451 A | * | 9/1995 | Sokol | .......................... | 522/42 |
| 5,504,133 A | * | 4/1996 | Murouchi et al. | .......... | 524/430 |
| 5,614,581 A | * | 3/1997 | Cobbledick et al. | ........ | 524/495 |
| 5,639,546 A | * | 6/1997 | Bilkadi | ....................... | 428/331 |
| 5,773,487 A | * | 6/1998 | Sokol | .......................... | 522/42 |
| 5,858,545 A | * | 1/1999 | Everaerts et al. | ........... | 428/447 |
| 6,290,881 B1 | * | 9/2001 | Krohn | ......................... | 252/600 |
| 6,350,792 B1 | * | 2/2002 | Smetana et al. | .............. | 522/81 |
| 6,420,607 B1 | * | 7/2002 | Hamrock et al. | ............. | 568/32 |
| 6,541,076 B2 | * | 4/2003 | Dunkle | ....................... | 427/458 |

* cited by examiner

*Primary Examiner*—James J. Seidleck
*Assistant Examiner*—Sanza L McClendon
(74) *Attorney, Agent, or Firm*—The Weintraub Group, PLC

(57) ABSTRACT

An electroconductive coating composition which function as a sealer/primer includes (a) a radiation curable, polymerizable compound, (b) a photoinitiator and (c) a conductive pigment. The conductive pigment may be a mixture of pigment including a blend of conductive pigments as well as conductive pigment. Conductivity enhancers may, also, be added. The polymerizable compound is, preferably, a U curable acrylate functional compound which may be monofunctional or polyfunctional. The composition is particularly useful for sealing and priming SMC panels.

15 Claims, No Drawings

100% SOLIDS RADIATION CURABLE CONDUCTIVE PRIMER

CROSS-REFERENCE TO RELATED APPLICATIONS

This application is a completion application of co-pending provisional application Ser. No. 60/274,000, filed Mar. 7, 2001, entitled "100% Solids Radiation Curable Conductive Primer," the disclosure of which is hereby incorporated by reference.

BACKGROUND OF THE INVENTION

1. Field of the Invention

The present invention concerns coating compositions. More particularly, the present invention concerns electroconductive sprayable primers. Even more particularly, the present invention concerns substantially 100% solids, sprayable, radiation curable electroconductive coating compositions.

2. Prior Art

As is known to those skilled in the art to which the present invention pertains, many large, durable and lightweight plastic compositions are formulated from what is known as sheet molded compound (SMC). Sheet molded compound is, essentially, a thermoset resin mixture comprising a polymer, glass fibers, and fillers. SMC is noted for its lightweight, durable and consistent part dimensional stability i.e., minimal shrinkage.

The formulations for SMC compounds are well known to the skilled artisan. Generally the polymer is selected according to the desired properties of the product produced therefrom, as well as the processing parameters. In fabricating items from SMC, usually, the SMC resin is processed into a mat or pre-form and, then, placed under heat and several tons of pressure in a suitable mold to form the item, although other manufacturing processes may exist. The mold conforms the mat to the requisite part or shape. After forming the mat into the desired shape, the item produced is removed from the mold and it is, then, finished such as by painting or the like.

Where SMC is used for the manufacture of large items, such as automotive body panels, the finish is, preferably, applied through electrostatic spraying. However, other spray application methods may be used, such as, for example, siphon feed spray guns, gravity feed spray guns, High Volume Low Pressure (HVLP) spray guns, airless spray systems, air assisted airless spray systems, rotary atomizer, disk rotators and the like, as well as combinations thereof.

However, SMC panels, when exposed to electrostatic spray finishes, present certain unique problems. First, because SMC is a non-conductive plastic, it does not have the capacity to carry an electrical current. Therefore, a conductive solution or coating, such as a conductive primer, conductive preparation coat, conductive undercoat or the like must be applied to the SMC surface so that subsequent coatings can be applied thereover via electrostatic application.

Such conductive solutions or coatings are known in the prior art. Ordinarily, these prior art primers are either solvent-based, water based, powder coatings, or combinations thereof These primers, generally, require a cure at elevated temperatures in a suitable oven after application. However, because of the inherent nature of SMC, this creates certain problems. SMC materials are porous. When solvent evaporates or is removed from the coating, there is a tendency for surface irregularities, which are manifested by bubbly looking voids or "pops" to appear or be created on the surface of the finished product. Oftentimes, the "pops" may not be noticed until a final topcoat is applied and cured. Obviously, this causes a great expense in labor and materials to correct the problem. The porous nature of the SMC and the problems it creates vis-à-vis finishing, may be more pronounced where there are sharp edges associated with the molded part. Sharper edges in an SMC part may exhibit a greater propensity for the "pops" to occur. Although manufacturing or molding techniques have been developed to deter the problems associated with the porosity, it still remains a problem. Presently, the techniques used to limit porosity vary from manufacturer to manufacturer. Among the most common practices used today are either air-drying or the use of force air-dried two part coating compositions. In either instance, though, this involves added labor, energy, opportunity and material costs, as well as volatile organic component (VOC) emissions.

Other manufacturers may abrade those areas which exhibit porosity, after the first coat of primer is applied and cured, by methods such as sanding those areas or the like. Thereafter, a second coat of primer is applied to the product. Clearly, this adds labor and material, as well as energy costs, for smoothing out the surface and removing the pops.

Aside from the irregularities, prior art coatings create added expense in their very application. Usually, with solvent-based, water-based, powder coating applications, and combinations thereof, a primer coating or multiple primer coatings is applied to the part, and may be followed by sealant coating(s), and, then, a topcoat, being applied thereover. Most of the above coating systems are cured at elevated temperatures. The topcoat is generally the last coating operation done in the system. The application of these layers can add expense in labor, VOC emissions, energy, and materials. The subsequent result is a reduced production rate.

As is detailed hereinafter, the present invention alleviates many of the problems encountered heretofore by providing a substantially 100% solids, sprayable, radiation curable, conductive coating composition which not only functions as a primer but may also be utilized as a sealer or a combination, as well.

SUMMARY OF THE INVENTION

The composition hereof, generally, comprises a mixture of: (a) a radiation curable, polymerizable compound which may be either a polymer, a pre-polymer, a monomer, and mixtures thereof; (b) a photoinitiator which may be a blend of photoinitiators; and (c) a conductive pigment or a mixture of pigments.

More particularly, the composition hereof, generally, comprises (a) from about 20% to about 99%, by weight, based on the total weight of the composition of a radiation curable, polymerizable compound, (b) from about 0.5% to about 18%, by weight, based upon the total weight of the composition, of the photoinitiator and (c) from about 0.5% to about 50%, by weight, based upon the total weight of the composition, of the electroconductive pigment.

The pigment mixture may comprise both conductive and non-conductive pigments in admixture including (a) mixtures of conductive pigments and (b) mixtures of conductive and non-conductive pigment.

Also the composition hereof may contain adjuvants such as flow additives, dispersion aids, defoamers, deaerators, suspension aids, and mixtures thereof. Other adjuvants, as needed, may also, be incorporated hereinto.

The composition may also contain fillers or extenders that may be organic or inorganic, as well as mixtures thereof.

The composition hereof is, preferably, used to coat SMC surfaces and, in particular, automotive panels. It is to be understood, however, that the present invention also contemplates coating SMC surfaces other than automotive panels, as well as other substrates such as, but not limited to, reaction injection molding (RIM), reaction thermal molding (RTM), hand lay up, acrylonitrile butadiene styrene (ABS), thermoplastic olefin (TPO), polycarbonate (PC), hybrid molding, and the like.

The present coating composition functions not only as a primer but as a sealer as well, thus, eliminating the need for separate primer and sealer coatings.

For a more complete understanding of the present invention, reference is made to the following detailed description and accompanying example.

DESCRIPTION OF THE PREFERRED EMBODIMENT

In accordance herewith there is provided a composition for sealing and priming porous plastic substrates. The composition hereof, generally, comprises a mixture of: (a) a radiation curable, polymerizable compound which may be either a polymer, a pre-polymer, a monomer, and mixtures thereof, (b) a photoinitiator which may be a blend of photoinitiators; and (c) a conductive pigment or a mixture of pigments.

More particularly and, as noted above, the composition hereof, comprises: (a) from about 20% to about 99%, by weight, based on the total weight of the composition, of a radiation curable, polymerizable compound, (b) from about 0.5% to about 18%, by weight, based upon the total weight of the composition of the photoinitiator and (c) from about 0.5% to about 50%, by weight, based upon the total weight of the composition, of the pigment.

The pigment mixture may comprise both conductive and non-conductive pigments in admixture including (a) a mixture of conductive pigments and (b) a mixture of conductive and non-conductive pigment.

Dispersion aids, flow additives, defoamers, deaerators, suspension aids, and mixtures thereof may be incorporated hereinto to tailor the properties of the primer/sealer. Other adjuvants, as needed, may also, be incorporated hereinto. The composition may, also, contain fillers or extenders that may be organic or inorganic, as well as mixtures thereof.

The present coating composition functions not only as a primer but as a sealer, thus, eliminating the need for separate primer and sealer coatings.

As noted, the first component of the present composition is a substantially solvent free, sprayable, radiation curable polymerizable compound which is, preferably, acrylate functional. Where the compound is acrylate functional, the acrylate may be monofunctional or polyfunctional. Also, mixtures of acrylate functional compounds may be used. Such a mixture may comprise all monofunctional acrylate, all polyfunctional compounds, or mixtures thereof.

Useful acrylates or acrylate functional components include monoacrylates, diacrylates, triacrylates, polyacrylates, aliphatic and aromatic urethane-modified acrylates, urethane acrylates, polyester-modified acrylates, polyester acrylates, vinyl acrylates, epoxy acrylates, epoxy modified acrylates, polyether acrylates, amine modified acrylates, acrylic polymer modified acrylates, acid functional acrylates, acid modified acrylates, silicone acrylates, silicone modified acrylates, acrylate functional cycloaliphatic resins, acrylate functional cationic resins, hybrid acrylates, and mixtures thereof.

Other useful acrylate functional compounds which may be used in the practice of the present invention include, for example, ethoxylated bisphenol A acrylates, propoxylated acrylates, ethoxylated acrylates, trifunctional acrylic esters, unsaturated cyclic diones, polyester acrylates, silica acrylates, acrylic acrylates, as well as mixtures and derivatives of the above compositions.

Other radiation polymerizable compounds which may be used herein, alone or in admixture with the compounds enumerated herein include, for example, unsaturated polyesters, unsaturated resins, styrene, vinyl ethers, vinyl esters and the like as well as mixtures thereof As used herein, the polymerizable compound, preferably, comprises a mixture of acrylates and more preferably, a mixture of monomeric polymerizable acrylates and pre-polymer acrylates. The preferred acrylates useful herein are selected from the group consisting of trimethylol propane triacrylate, 1, 6-hexane diol diacrylate, epoxy acrylate, aliphatic urethane acrylate, isobornyl acrylate, tetrahydrofurfuryl acrylate, as well as mixtures and derivatives thereof. The monomeric acrylates function as adhesion promoters as well as controlling the viscosity of the final composition and provide various characteristics upon cure. It should be noted that a single acrylate may, also, be used herein.

As noted hereinabove, generally, the mixture of acrylates will be present in the composition in an amount ranging from about 20% to about 99%, by weight, based on the total weight of the composition and, preferably, from about 55% to about 70%, by weight, based upon the total weight of the composition.

Where a mixture of acrylate functional and/or radiation polymerizable compounds is used, the presence of each component(s) in the mixture will vary, primarily depending on the desired properties of the resulting, i.e. hardness, degree of filling, etc.

The photoinitiator, or photoinitiator blend, which is used in the composition of the present invention may be of the free radical or cationic type or combinations thereof. A mixture of photoinitiators may be used.

Photoinitiators which are suitable for use in the practice of the present invention include, for example, 1-phenyl-2-hydroxy-2-methyl-1-propanone, oligo-2hydroxy-2-methyl-1-(4-[[1-methylvinyl]phenyl]-propanone), benzophenone, and 2-methyl-1-[4-(methylthio) phenyl]-2-(4-morpholino)-1-propanone; 1-hydroxycyclohexyl phenyl ketone, acetophenones such as (2,2-dimethoxy-2-phenylacetophenone), 2,4,6-trimethyl benzophenone and other such benzophenone derivatives, phosphine oxide derivatives such as (phosphine oxide phenyl-bis [2,4,6-trimethyl benzoyl]), [bis (2,6-dimethoxybenzoyl) (2,4,4-trimethylpentyl) phosphine oxide] and the like as well as mixtures and derivatives thereof.

As noted hereinabove the photoinitiator is present in an amount ranging from about 0.5% to about 18%, by weight, based upon the total weight of the composition.

The third component of the coating composition is the conductive pigment. Usually conductive pigments of the type contemplated for use herein, ordinarily, include conductive carbon black pigment. These conductive pigments are well-known and commercially available compounds and are, generally, defined as dry conductive carbon black pigment. Other well-known conductive pigments which may be used herein include antimony-doped tin oxide, nickel, and graphite. Dispersions can be made of any of the pigments in monomers or oligomers or combinations thereof Herein, preferably, a mixture of conductive pigments is employed.

Other components that can be added to the present coating system to induce or enhance conductivity include, additional conductive pigments other than those enumerated above and include metallic pigments such as gold, platinum, silver, titanium, aluminum, copper, and the like, as well as mixtures thereof. These conductive metal pigments may be supported or unsupported. These metallic pigments come in forms such as flakes, powders, spheres, microballoons, microencapsulated, or other physical forms. Other conductive materials that are contemplated for use herein include encapsulated pigments; conductive polymers; conductive fibers (fibrols or fibrils); conductive additives, as well as mixtures thereof These additional conductive materials may be used conjointly with the conductive pigments identified above. Where used, the conductivity enhancers will be present in an amount dependent on the desired conductivity level of the composition.

The total amount of conductive material, i.e., pigment with or without enhancer, is, generally, employed in an amount ranging from about 0.5% to about 50%, by weight, based upon the total weight of the composition. The amount of conductive pigment generally is dependent upon the final desired conductivity level of the composition.

As noted hereinabove minor amounts of adjuvants may be incorporated herein such as, flow additives, dispersing aids, defoamers, deaerators, suspension aids, scavengers, stabilizers, antioxidants, plasticizers, nonfunctional or nonreactive diluents, hydrocarbon oils, and the like, as well as mixtures thereof.

Suitable fillers or extenders which may be added to the composition for various properties include the commonly used fillers or extenders, such as carbonates, silicates, sulfates, silicas, silicates, sulfites, clays, carbides, oxides, polyfluorinated ethylenes, ferrites, aluminas, nitrides, polymeric fillers, fibers, cellulosics, ceramics, plant by-products, animal by-products, wood products, wood by-products, agricultural by-products, and the associated precipitates, derivatives, and hydrates and the like, as well as mixtures thereof These extenders may be in a treated or non-treated form, and may be natural occurring products or synthetically manufactured, and may be reclaimed or recycled, as well as combinations thereof.

The composition may also contain various pigments to introduce color to the composition. Common pigments used may include, titanium dioxide, phthalos, iron oxides, lamp black, carbon black, various organic and inorganic pigments, and mixtures thereof.

In preparing a coating composition in accordance herewith the photoinitiators are dispersed in the acrylate or other radiation curable material and dissolved therewithin. Generally, additives that promote certain properties are added at this point. Thereafter, the pigment is admixed therewith along with any fillers and the like. The so-produced admixture is, then, ground to requisite particle size for assisting in the electroconductive nature of the composition. Finally, adhesion promoters are incorporated therewith. This procedure does contemplate changing the order of addition and manufacturing process and is carried out at ambient conditions.

The resulting compositions are sprayable onto an SMC surface through conventional electrostatic spraying equipment as well as standard siphon feed spray guns, HVLP spray guns, airless spray equipment, air assisted airless spray equipment, disk rotators, rotary atomizers, and the like depending on the mode of application, as denoted above.

The polymer is cured by a rapid polymerization reaction which is initiated by the photoinitiator component of the composition when it is exposed to suitable radiation or other catalyzing effect. Among the useful methods of polymerization initiation to effect a variable degree of cure include, for example: ultraviolet light, nitrogen introduction, inhibitor depletion, moisture, electron beam, peroxide, Michael addition, chemical methods, thermal introduction, oxygen scavenging, cross-linking agents, accelerators, synergists, cationic methods, as well as combinations thereof Substantially the entire composition remains in place on the substrate before, during and after curing.

As noted, the polymer of the present invention is preferably cured by exposure to UV radiation and, thus, may be cured by natural sunlight, medium pressure mercury arc lights, doped or modified mercury lamps, microwave system lamps, long wave ultraviolet light, or any source of UV radiation strong enough to give proper cure, and combinations thereof. The radiation curable polymer is, preferably, cured under a dosage of UV radiation within, preferably, but is not limited to, the ranges between 0.5 joules/cm$^2$ to 7 joules/cm$^2$, to reduce the likelihood of elevated heat levels. Sustained elevated heat levels may cause detrimental effects to the cured polymer.

As noted hereinabove the present coating composition is useful both as an electrically conductive primer and sealer. After being deposited onto a surface, other electrically conductive or non-electroconductive coatings may be applied via electrostatic or other application method or methods thereonto because of the electrically conductive nature of the coating in the liquid and cured state.

The composition hereof is, preferably, used to coat SMC surfaces and, in particular, automotive panels. It is to be understood, however, that the present invention also contemplates coating SMC surfaces other than automotive panels, as well as other substrates such as, but not limited to, reaction injection molding (RIM), reaction thermal molding (RTM), hand lay up, acrylonitrile-butadiene styrene (ABS), thermoplastic olefin (TPO), polycarbonate (PC), hybrid molding, and mixtures thereof.

For a more complete understanding of the present invention reference is made to the following illustrative example. In the examples all parts are by weight, absent indications to the contrary.

EXAMPLE

This example illustrates a UV curable, 100% solids, sprayable conductive primer in accord herewith. Into a suitable vessel equipped with stirring means were added the following ingredients and amounts.

| Ingredient | Amount, pbw |
|---|---|
| Acrylate Blend[1] | 58.5 |
| Photoinitiator Blend[2] | 6.0 |
| Flow additive[3] | 1.0 |
| Dispersion additive[4] | 1.0 |
| Suspension additive[5] | 0.5 |

-continued

| Ingredient | Amount, pbw |
|---|---|
| Talc, as filler | 3.0 |
| Conductive pigment[6] | 30.0 |
| | 100.0 |

[1] a mixture of urethane acrylate; epoxy acrylate; 1,6-hexanediol diacrylate, tetrahydrofurfuryl acrylate, and isobornyl acrylate
[2] a mixture of ketones and phosphine oxides
[3] a commercially available mineral oil based additive
[4] a commercially available mineral oil based additive
[5] a commercially available mineral oil based additive
[6] a mixture of conductive pigments of antimony-doped tin oxide and conductive carbon black

EXAMPLE II

This example illustrates a conductive primer in accordance herewith for spraying onto a very resin rich, hard SMC.

The conductive sealer is a non-sanding sealer having the following ingredients:

| Ingredient | Amount, pbw |
|---|---|
| Acrylate[1] | 70.0 |
| Photoinitiator[2] | 5.0 |
| Conductive pigment[3] | 25.0 |
| | 100.0 |

[1] tetrahydrofurfuryl acrylate
[2] same as Example I
[3] same as Example I

EXAMPLE III

This example illustrates a conductive UV curable primer in accordance with the present invention for use with a highly filled SMC.

| Ingredients | Amount, pbw |
|---|---|
| Oligomer Acrylate[1] | 50.0 |
| Monomer Acrylate[2] | 20.0 |
| Photoinitiator[3] | 5.0 |
| Conductive pigment[4] | 25.0 |
| | 100.0 |

[1] a mixture of urethane acrylate and epoxy acrylate
[2] a mixture of tetrahydrofurfuryl acrylate and isobornyl acrylate.
[3] Same as example I
[4] Same as example I In practicing the present invention to reduce UV weathering, UV stabilizers may be added. Similarly, where sanding and subsequent surface coating is desired, fillers, such as talc, may be incorporated into the composition.

It is to be appreciated from the above that there has been described herein a conductive primer/sealer which can be electrostatically sprayed and which is substantially solvent free.

Having, thus, described the invention, what is claimed is:

1. An electroconductive sealer/primer composition, comprising:
   (a) a radiation curable, polymerizable compound,
   (b) a photoinitiator blend, and
   (c) a conductive pigment comprising a mixture of (a) carbon black and,
   (b) a compound selected from the group consisting of antimony-doped tin oxide, nickel, graphite and mixtures thereof.

2. The composition of claim 1 which further comprises:
   (a) from about 20% to about 99% by weight, based on the total weight of the total composition, of the polymerizable compound,
   (b) from about 0.5% to about 18% by weight, based upon the total weight of the composition, of the photoinitiator, and
   (c) from about 0.5% to about 50% by weight, based upon the total weight of the composition of the pigment.

3. The composition of claim 1 where the polymerizable compound is acrylate functional, the acrylate functional compound being either monofunctional or polyfunctional.

4. The composition of claim 3 wherein the acrylate functional compound is selected from the group consisting of:
   monoacrylates, diacrylates, triacrylates, urethane acrylates, polyester acrylates, vinyl acrylates, epoxy acrylates, polyether acrylates, amine-modified acrylates, acrylic polymer-modified acrylates, acid functional acrylates, silicone acrylates, acrylate functional cycloaliphatic resins, and acrylate functional cationic resins, ethoxylated bisphenol A acrylates, propoxylated acrylates, ethoxylated acrylates, trifunctional acrylic esters, unsaturated cyclic diones, polyester acrylates, silica acrylates, acrylic acrylates, and mixtures thereof.

5. The composition of claim 1 wherein the radiation polymerizable compound is selected from the group consisting of unsaturated polyesters, styrene, vinyl ethers, vinyl esters and mixtures thereof.

6. The composition of claim 4 wherein the acrylate is a mixture of monomeric polymerizable acrylates and prepolymer acrylates.

7. The composition of claim 6 wherein the acrylate is selected from the group consisting of:
   trimethylol propane triacrylate, 1,6-hexane did diacrylate, epoxy acrylate, aliphatic urethane acrylate, isobornyl acrylate, tetrahydrofurfuryl acrylate, and mixtures thereof.

8. The composition of claim 1 wherein the photoinitiator is selected from the groups consisting of:
   1-phenyl-2-hydroxy-2-methyl-1-propanone, oligo-2hydroxy-2-methyl-1-(4-[[1-methylyinyl]phenyl]-propanone), benzophenone, 2-methyl-1-[4-(methylthio) phenyl]-2-(4-morpholino)-1-propanone; 1-hydroxycyclohexyl phenyl ketone, (2,2-dimethoxy-2-phenylacetophenone), 2,4,6-trimethyl benzophenone (phosphine oxide phenyl-bis [2,4,6-trimethyl benzoyl]), [bis(2,6-dimethoxybenzoyl)(2,4,4-trimethylpentyl)phosphine oxide] and mixtures thereof.

9. The composition of claim 1, wherein the conductive pigment further comprises a non-conductive pigment.

10. The composition of claim 1 which further comprises:
    a conductivity enhancer.

11. The composition of claim 10 wherein the conductivity enhancer is selected from the group consisting of:
    gold, platinum, silver, titanium, aluminum, copper, and mixtures thereof.

12. A method of priming and sealing a non-conductive plastic substrate, comprising:
    spraying onto the substrate the composition of claim 1.

13. The method of claim 11 wherein the substrate is selected from the group consisting of SMC, reaction injection molding, reaction thermal molding, hand lay up, acrylonitrile-butadiene-styrene, thermoplastic olefin, polycarbonate, and hybrid molding.

14. The method of claim 13 wherein the substrate is SMC.

15. The method of claim 14 wherein the SMC substrate is an automotive body panel.

* * * * *